US011107192B2

United States Patent
Asai et al.

(10) Patent No.: US 11,107,192 B2
(45) Date of Patent: Aug. 31, 2021

(54) DISPLAY CONTROL DEVICE AND METHOD FOR GENERATING AN IMAGE OF A REAR VIEW OF A VEHICLE

(71) Applicant: TOYOTA JIDOSHA KABUSHIKI KAISHA, Toyota (JP)

(72) Inventors: Goro Asai, Toyota (JP); Tomoaki Iida, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/923,228

(22) Filed: Mar. 16, 2018

(65) Prior Publication Data

US 2018/0276795 A1 Sep. 27, 2018

(30) Foreign Application Priority Data

Mar. 22, 2017 (JP) .............................. JP2017-055948

(51) Int. Cl.
| | |
|---|---|
| *G06T 3/60* | (2006.01) |
| *B60R 1/00* | (2006.01) |
| *G06T 3/00* | (2006.01) |
| *B60R 1/06* | (2006.01) |
| *G06T 5/00* | (2006.01) |
| *G06T 11/00* | (2006.01) |

(52) U.S. Cl.
CPC ............... *G06T 3/60* (2013.01); *B60R 1/00* (2013.01); *B60R 1/06* (2013.01); *G06T 3/00* (2013.01); *G06T 5/006* (2013.01); *G06T 11/001* (2013.01); *B60R 2300/30* (2013.01); *B60R 2300/8046* (2013.01); *B60R 2300/8066* (2013.01); *G06T 2207/10024* (2013.01); *G06T 2207/30252* (2013.01)

(58) Field of Classification Search
CPC .. G06T 3/60; G06T 3/00; G06T 5/006; G06T 11/001; G06T 2207/10024; G06T 2207/30252; B60R 1/00; B60R 1/06; B60R 2300/30; B60R 2300/8046; B60R 2300/8066
See application file for complete search history.

(56) References Cited

U.S. PATENT DOCUMENTS 7,567,752 B2 * 7/2009 Klinghult ............... G03B 17/20
348/208.4
7,777,611 B2 * 8/2010 Desai ................... B60Q 1/2665
340/425.5
(Continued)

FOREIGN PATENT DOCUMENTS

| CN | 102481875 A | 5/2012 |
|---|---|---|
| JP | 11-1144 A | 1/1999 |

(Continued)

*Primary Examiner* — Phuc N Doan
(74) *Attorney, Agent, or Firm* — Oblon, McClelland, Maier & Neustadt, L.L.P.

(57) ABSTRACT

A display control device for a vehicle is mounted on a host vehicle, and the display control device for a vehicle is configured to generate a non-rectangular image from a rectangular image of an area located rearward of the host vehicle, the rectangular image being captured by a capturing unit mounted on the host vehicle, and display the non-rectangular image in a rectangular display area of a display unit.

19 Claims, 4 Drawing Sheets

(56) References Cited

U.S. PATENT DOCUMENTS

| | | | | |
|---|---|---|---|---|
| 2006/0197843 A1* | 9/2006 | Yoshimatsu | ........ | H04N 5/23293 |
| | | | | 348/219.1 |
| 2011/0149094 A1* | 6/2011 | Chen | ................. | H04N 5/23248 |
| | | | | 348/208.3 |
| 2012/0154589 A1* | 6/2012 | Watanabe | ................. | B60R 1/00 |
| | | | | 348/148 |
| 2013/0038735 A1* | 2/2013 | Nishiguchi | .............. | H04N 7/18 |
| | | | | 348/148 |
| 2013/0222935 A1* | 8/2013 | Furlow, Jr. | .............. | B60R 1/082 |
| | | | | 359/868 |
| 2014/0043466 A1* | 2/2014 | Sato | .......................... | B60R 1/00 |
| | | | | 348/115 |
| 2014/0240500 A1* | 8/2014 | Davies | ................... | H04N 7/183 |
| | | | | 348/148 |
| 2014/0333729 A1* | 11/2014 | Pflug | ........................ | G06T 15/20 |
| | | | | 348/47 |
| 2014/0347489 A1* | 11/2014 | Kumon | .................... | B60R 1/00 |
| | | | | 348/148 |
| 2015/0138225 A1* | 5/2015 | Minato | ................... | G06T 11/60 |
| | | | | 345/593 |
| 2016/0214536 A1* | 7/2016 | Burdge | ................... | B60R 1/007 |
| 2021/0009036 A1* | 1/2021 | Kosugi | .................... | B60R 1/00 |

FOREIGN PATENT DOCUMENTS

| | | | |
|---|---|---|---|
| JP | 2001-105974 A | 4/2001 | |
| JP | 2013-197816 A | 9/2013 | |
| JP | 2013-207746 A | 10/2013 | |
| JP | 5888339 | 3/2016 | |
| WO | WO 2011/030698 A1 | 3/2011 | |
| WO | WO2015158416 | * 10/2015 | ..... B60R 2300/8046 |

\* cited by examiner

FIG. 3D

DISPLAY CONTROL DEVICE AND METHOD FOR GENERATING AN IMAGE OF A REAR VIEW OF A VEHICLE

INCORPORATION BY REFERENCE

The disclosure of Japanese Patent Application No. 2017-055948 filed on Mar. 22, 2017 including the specification, drawings and abstract is incorporated herein by reference in its entirety.

BACKGROUND

1. Technical Field

The present disclosure relates to a display control device for a vehicle, a display control system for a vehicle, and a display control method for a vehicle.

2. Description of Related Art

For example, Japanese Patent No. 5888339 discloses a device that displays a vehicle's behind-the-vehicle image, captured by a capturing unit such as a camera provided outside the vehicle, on a display unit such as a display provided in the vehicle interior.

SUMMARY

An image captured by a camera rotates as the camera rotates. Therefore, if a camera attached to a vehicle (vehicle body) has rotation incorrectness about the optical axis, the horizontal axis (road surface, horizon line, etc.) of an image displayed on the display also tilts by an amount corresponding to the error.

When an image with the tilted horizontal axis is displayed on a display that has a rectangular display area such as a rectangle, the horizontal axis of the image do not become parallel to the straight line of the outer frame of the display area. In such a case, there is a possibility that the vehicle occupants such as the driver easily recognize this tilted image and feel discomfort about it.

The present disclosure provides a display control device for a vehicle, a display control system for a vehicle, and a display control method for a vehicle that can reduce an uncomfortable feeling of the vehicle occupants caused by a tilted image displayed on the display unit.

A first aspect of the present disclosure provides a display control device for a vehicle. The display control device for a vehicle according to the first aspect is mounted on a host vehicle, and the display control device for a vehicle is configured to generate a non-rectangular image from a rectangular image of an area located rearward of the host vehicle, the rectangular image being captured by a capturing unit mounted on the host vehicle, and display the non-rectangular image in a rectangular display area of a display unit.

In this way, the image captured by the capturing unit (such as a camera) can be displayed on the display unit (such as a display) in a non-rectangular form. As a result, even when an image with a tilted horizontal axis is displayed on the display unit having a rectangular display area, the display control device reduces the possibility that the occupants recognize that the image is tilted (unlikely to feel uncomfortable about the tilted image) and, therefore, reduces the occupant's discomfort.

The display control device for a vehicle is applicable to an electronic outer mirror system by generating the above-described non-rectangular image in such a way that, in the vehicle vertical direction, the image width is reduced gradually from near to far with respect to the vehicle.

In the first aspect, the non-rectangular image may be generated such that a width of the non-rectangular image in a vehicle vertical direction is larger in a first part of the non-rectangular image compared with a second part of the non-rectangular image. The first part may correspond to a first area located rearward of the host vehicle. The second part may correspond to a second area located rearward of the host vehicle. The first area may be closer to the host vehicle than the second area.

In the first aspect, the display control device may be configured to generate the non-rectangular image by compressing a part of the rectangular image.

In the first aspect, the display control device may be configured to generate the non-rectangular image by extracting a part of the rectangular image from the rectangular image.

In the first aspect, the display control device may be configured to display a part included in the rectangular display area of the display unit in a color approximate to a color of an outer frame of the rectangular display area, the part being an area in which the non-rectangular image is not displayed.

In the first aspect, the display control device may be configured to display a part included in the rectangular display area of the display unit in the same color as the color of the outer frame of the rectangular display area, the part being an area in which the non-rectangular image is not displayed.

Displaying the non-image part in this way makes the vehicle occupants feel as if the part, where the non-rectangular is not displayed, and the outer frame of the rectangular display area of the display unit were integrated. This can further improve the driver's discomfort caused by a tilted image.

In the first aspect, the display control device may be configured to generate the non-rectangular image by compressing the rectangular image such that a compression ratio of the rectangular image gradually increases from the first part to the second part, in the vehicle vertical direction.

In the first aspect, the non-rectangular image may be generated such that the width of the non-rectangular image in the vehicle vertical direction is reduced gradually from the first part to the second part.

In the first aspect, the display unit may be an electronic mirror and the capturing unit is a sensor positioned on a side of the host vehicle.

A second aspect of the present disclosure provides a display control system for a vehicle. The display control system for a vehicle according to the second aspect includes: a display unit having a rectangular display area; and a display control device for a vehicle, the display control device being configured to generate a non-rectangular image from a rectangular image of an area located rearward of a host vehicle, the rectangular image being captured by a capturing unit mounted on the host vehicle and to display the non-rectangular image in the rectangular display area.

A third aspect of the present disclosure provides display control method for a vehicle. The display control method for a vehicle according to the third aspect includes: generating a non-rectangular image from a rectangular image of an area located rearward of a host vehicle, the rectangular image being captured by a capturing unit mounted on the host vehicle; and displaying the non-rectangular image in a rectangular display area of a display unit mounted on the host vehicle.

As described above, the display control device for a vehicle, a display control system for a vehicle, and a display control method for a vehicle according to the present disclosure reduces the discomfort of the vehicle occupants caused by a tilted image displayed on the display unit.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overview

The present disclosure provides a display control device for a vehicle. This display control device is mounted on a vehicle for displaying the vehicle's behind-the-vehicle image, captured by a capturing unit, on a display unit that has a rectangular display area. This display control device processes a rectangular image, captured by a camera, into a non-rectangular image and displays the processed image on the display. As a result, even when an image with a tilted horizontal axis is displayed on the display that has a rectangular display area, the display control device reduces the possibility that the occupants recognize that the image is tilted and, therefore, reduces the occupant's discomfort.

[System Configuration]

Figure 1:
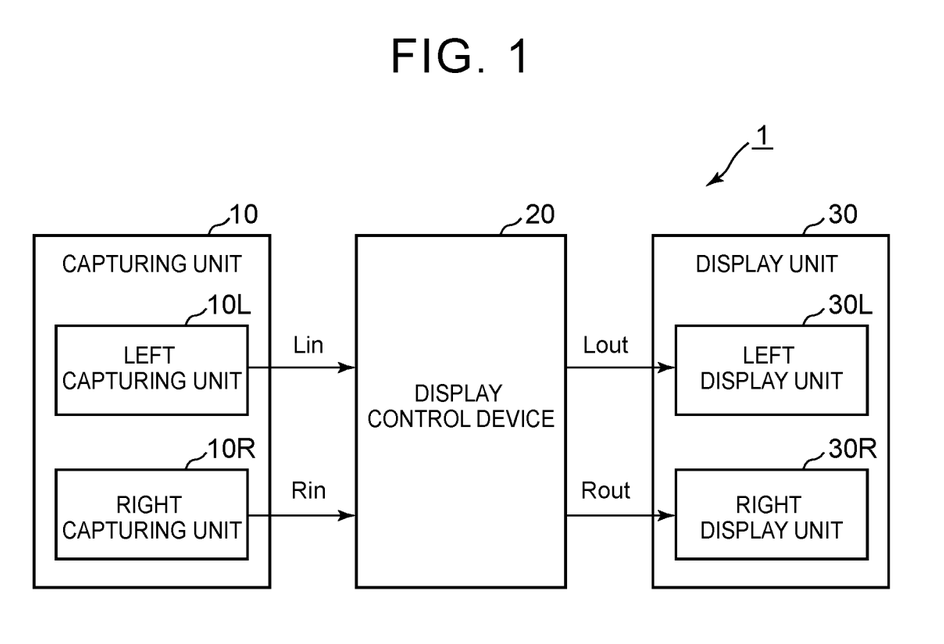
FIG. 1 is a diagram showing a general configuration of a vehicle system that includes a display control device for a vehicle according to one embodiment of the present disclosure.

FIG. 1 is a diagram showing a general configuration of a vehicle system 1 that includes a display control device 20 for a vehicle according to one embodiment of the present disclosure. The vehicle system 1 shown in FIG. 1 includes a capturing unit 10, the display control device 20 in this embodiment, and a display unit 30.

The vehicle system 1 exemplified in this embodiment is an electronic outer mirror system mounted on a vehicle as a substitute for an optical outer mirror (door mirror) system. The vehicle system 1 uses the display control device 20 to appropriately process the vehicle's laterally rearward image, captured by the capturing unit 10, and then displays the processed image on the display unit 30 as an electronic mirror image. In this specification, the terms "behind-the-vehicle" and "rearward" refer not only to an area directly behind the vehicle but also to the whole area behind the vehicle (both directly and laterally) in the vehicle longitudinal direction.

The capturing unit 10 includes a left capturing unit 10L and a right capturing unit 10R. The left capturing unit 10L is installed, for example, on the left side of the vehicle exterior. The left capturing unit 10L captures a predetermined range in the vehicle's left laterally rearward direction, which is behind its installation position, to acquire a rectangular left rearward image Lin. Similarly, the right capturing unit 10R is installed, for example, on the right side of the vehicle exterior. The right capturing unit 10R captures a predetermined range in the vehicle's right laterally rearward direction, which is behind its installation position, to acquire a rectangular right rearward image Rin.

As the left capturing unit 10L and the right capturing unit 10R, an image sensor, such as a Charge Coupled Device (CCD) sensor and a Complementary Metal Oxide Semiconductor (CMOS) sensor, or a camera equipped with optical lenses, can be used. The rectangular left rearward image Lin and the rectangular right rearward image Rin, captured respectively by the left capturing unit 10L and the right capturing unit 10R, are each output to the display control device 20.

The display control device 20 receives the rectangular left rearward image Lin from the left capturing unit 10L, and the rectangular right rearward image Rin from the right capturing unit 10R. After that, the display control device 20 uses a method, which will be described later, to generate a non-rectangular left rearward corrected image Lout from the rectangular left rearward image Lin, and a non-rectangular right rearward corrected image Rout from the rectangular right rearward image Rin. The generated images are output to the display unit 30, that is, the left rearward corrected image Lout to the left display unit 30L, and the right rearward corrected image Rout to the right display unit 30R, respectively.

The display control device 20 may be configured as an Electronic Control Unit (ECU) that typically includes a Central Processing Unit (CPU), a memory, and an input/output interface. The electronic control unit causes the CPU to read a predetermined program from the memory for execution in order to implement the predetermined function.

The display unit 30 includes a left display unit 30L and a right display unit 30R. The left display unit 30L is arranged, for example, in the left forward direction in the vehicle interior with respect to the driver's seat. The left display unit 30L displays the non-rectangular left rearward corrected image Lout, generated by the display control device 20, in the predetermined display area. Similarly, the right display unit 30R is arranged, for example, in the right forward direction in the vehicle interior with respect to the driver's seat. The right display unit 30R displays the non-rectangular right rearward corrected image Rout, generated by the display control device 20, in the predetermined display area.

A display panel such as a liquid crystal panel, a Light Emitting Diode (LED) panel, or an organic Electro Luminescence (EL) panel, can be used for the left display unit 30L and the right the display unit 30R. The left display unit 30L and the right display unit 30R each have a rectangular display area that is surrounded by a rectangular outer frame.

The left display unit 30L and the right display unit 30R may be implemented each as an independent display panel or may be implemented as a single display panel in which the display area is divided into two.

<Control Performed by Display Control Device>

Next, the non-rectangular image generation processing performed by the display control device 20 in one embodiment of the present disclosure will be described with reference to FIG. 2 and FIGS. 3A-3D. In the description below, only the processing for the vehicle's right laterally rearward image is described. Note that, though not included in the description below, the non-rectangular image generation processing is performed similarly for the vehicle's left laterally rearward image.

Figure 2:
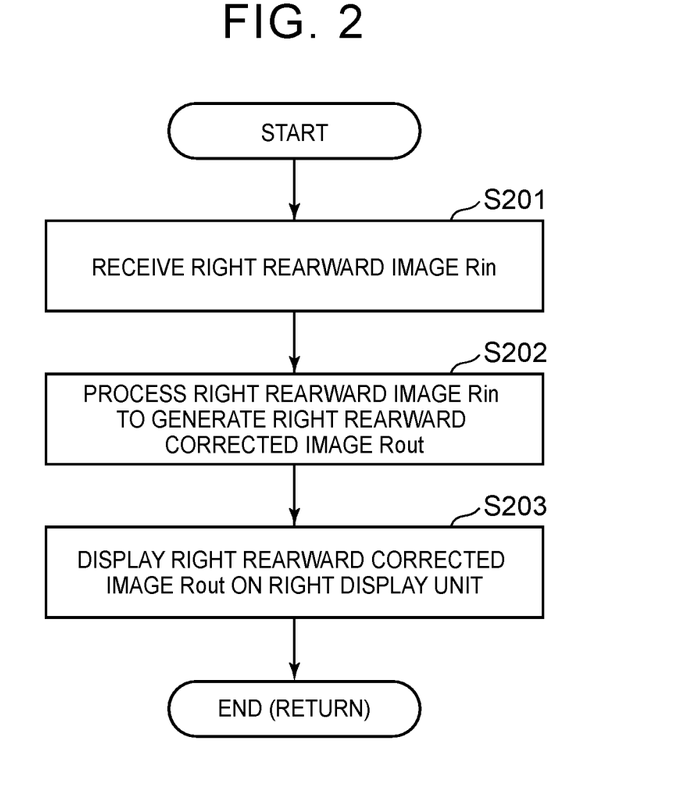
FIG. 2 is a flowchart showing a processing procedure for non-rectangular image generation processing performed by a display control device.

FIG. 2 is a flowchart showing a processing procedure performed by the display control device 20 to generate a non-rectangular right rearward corrected image Rout from a rectangular right rearward image Rin. FIGS. 3A-3D are diagrams showing the examples of a rectangular right rearward image Rin, a non-rectangular right rearward corrected image Rout (generated by the compression method), a non-rectangular right rearward corrected image Rout (generated by the discard method), and a non-rectangular rearward corrected image Rout (generated by the compression method) displayed in the rectangular display area of the right display unit 30R.

The processing shown in FIG. 2 is started, for example, when the door of the vehicle is unlocked or the engine is started. The processing is performed repeatedly, for example, at predetermined intervals until the door of the vehicle is locked or the engine is stopped.

Figure 3A:
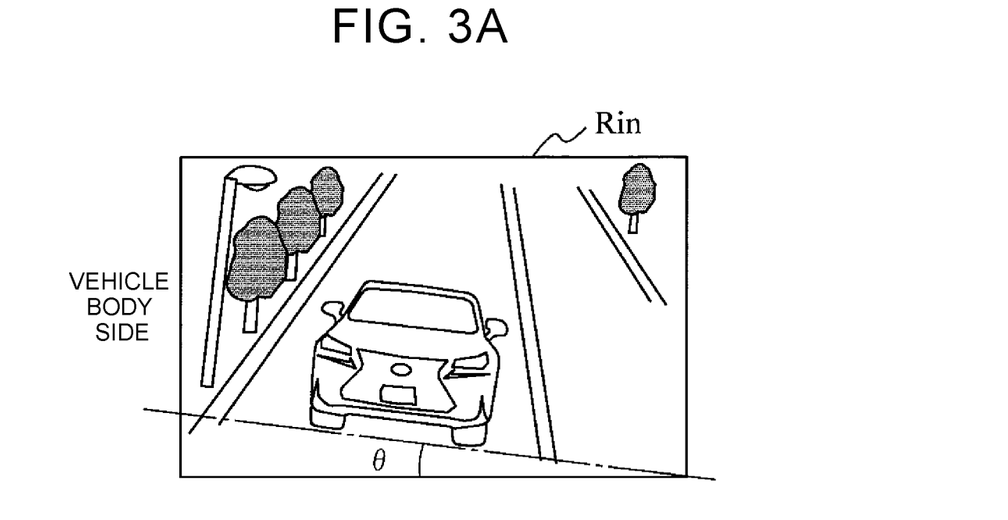
FIG. 3A is a diagram showing an example of a rectangular rearward image.

Step S201: In this processing, the display control device 20 receives a rectangular right rearward image Rin from the right capturing unit 10R. FIG. 3A is a diagram exemplifying one image of a right rearward image Rin in which the horizontal axis (road surface or horizon) in the image is tilted by +θ degrees in the clockwise direction with respect to the vehicle (vehicle body).

Step S202: In this processing, the display control device 20 performs the predetermined processing for the rectangular right rearward image Rin, received from the right capturing unit 10R, to generate a non-rectangular right rearward corrected image Rout. In the electronic outer mirror system in this embodiment, the non-rectangular right rearward corrected image Rout is generated from the rectangular right rearward image Rin in such a way that, in the vehicle vertical direction, the image width is reduced gradually from near to far with respect to the vehicle (vehicle body). To do so, one of the following two methods can be used.

Figure 3B:
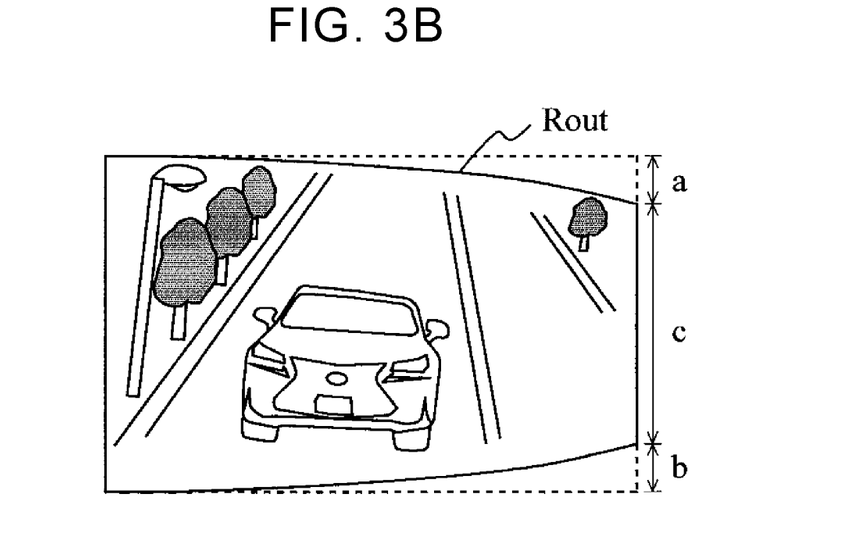
FIG. 3B is a diagram showing an example of a non-rectangular rearward corrected image generated by a compression method.

One method is a compression method. In this method, a part of the rectangular right rearward image Rin is compressed to generate a non-rectangular right rearward corrected image Rout. In the processing performed in the vehicle system 1 in this embodiment, the rectangular right rearward image Rin is compressed at a ratio according to the distance from the vehicle (vehicle body). The display control device 20 may control the compression ratio in such a way that the larger the distance from the vehicle in the video is, the higher the compression ratio becomes gradually. FIG. 3B is a diagram exemplifying one image of the non-rectangular right rearward corrected image Rout in which the image at the end farthest from the vehicle (vehicle body) is compressed at a ratio of "(a+b):c=3:7". Because the ratio used above is exemplary only, the ratio need not always be "(a+b):c=3:7". For example, the ratio may be "(a+b):c=4:6".

Figure 3C:
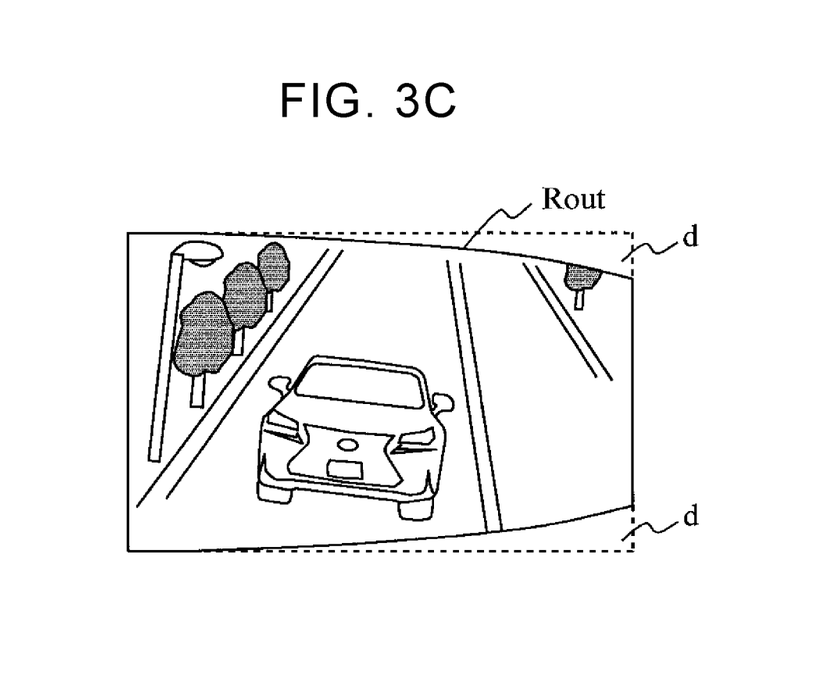
FIG. 3C is a diagram showing an example of a non-rectangular rearward corrected image generated by a discard method.

The other method is a discard method. In this method, the rectangular right rearward image Rin is not compressed but a part of the right rearward image Rin is discarded (without changing the curvature) to generate a non-rectangular right rearward corrected image Rout. In other words, the non-rectangular right rearward corrected image Rout is extracted from the rectangular right rearward image Rin. In the processing in the vehicle system 1 in this embodiment, a part of the right rearward image Rin is discarded (or cut out) according to an amount corresponding to the distance from the vehicle (vehicle body). FIG. 3C is a diagram exemplifying one image of the right rearward corrected image Rout generated by discarding the parts d from the right rearward image Rin.

Note that compression or discarding (or extraction) does not need to be performed evenly in the vertical direction of the rectangular right rearward image Rin; instead, the compression ratio or the discard amount (or extraction amount) may be changed between the upper end of the image and the lower end of the image. In addition, only one of the upper end of the image and the lower end of the image may be compressed or discarded (or extracted).

Figure 3D:
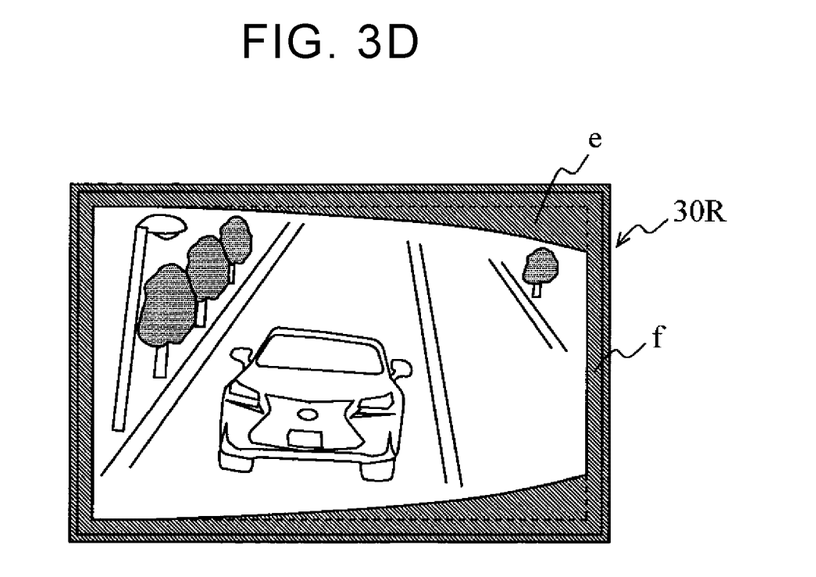
FIG. 3D is a diagram showing an example of a non-rectangular rearward corrected image displayed in the rectangular display area of a display unit.

Step S203: In this processing, the display control device 20 displays the generated non-rectangular right rearward corrected image Rout on the right display unit 30R. FIG. 3D is a diagram showing an example in which one image of the non-rectangular right rearward corrected image Rout (FIG. 3B), generated by the compression method, is displayed in the rectangular display area of the right display unit 30R.

In the example shown in FIG. 3D, the non-image part e in the non-rectangular right rearward corrected image Rout, in which the rectangular right rearward image Rin is compressed and the image is no longer displayed therein, is displayed in the rectangular display area in the same color as the outer frame f of the rectangular display area of the right display unit 30R. Displaying the non-image part e in this way makes the vehicle occupants, such as the driver, feel as if the non-image part e and the outer frame f of the rectangular display area of the right display unit 30R were integrated. This can improve the discomfort concerning the display caused due to a tilted image.

Operation and Effect in this Embodiment

The display control device 20 for a vehicle according to one embodiment of the present disclosure described above generates the non-rectangular rearward corrected images Lout and Rout from the rectangular rearward images Lin and Rin captured by the capturing unit 10 such as a camera. Then, the display control device 20 displays the generated non-rectangular rearward corrected images Lout and Rout in the rectangular display area of the display unit 30 such as a display.

The display control device 20 performs the control processing described above to display an image, captured by the capturing unit 10, on the display unit 30 in a non-rectangular form. As a result, even when an image with a tilted horizontal axis is displayed on the display unit 30 having a rectangular display area, the display control device 20 reduces the possibility that the occupants recognize that the image is tilted (unlikely to feel uncomfortable about the tilted image) and, therefore, reduces the occupant's discomfort.

This control processing can reduce the occupant's discomfort as described above. This, in turn, eliminates the need for extreme accuracy in mounting the capturing unit 10 on the vehicle (vehicle body) at the time of assembling the vehicle system 1 at a factory or in the software-based correction of the horizontally of the rearward images Lin and Rin captured by the capturing unit 10.

The images to be displayed in the rectangular display area of the display unit 30 are the non-rectangular rearward corrected images, Lout and Rout, that are generated in such a way that, in the vehicle vertical direction, the image width is reduced gradually from near to far with respect to the vehicle. By doing so, the display control device 20 is applicable to an electronic outer mirror system as described above.

Furthermore, the display control device 20 can display the non-image part e, where the non-rectangular rearward corrected images Lout and Rout are not displayed in the rectangular display area of the display unit 30, in the same color as the outer frame f of the rectangular display area. The non-image part e may also be displayed in a color approximate to the color (approximate color) of the outer frame f of the rectangular display area.

Displaying the non-image part e in this way makes the vehicle occupants feel as if the non-image part e, where the non-rectangular rearward corrected images Lout and Rout are not displayed, and the outer frame f of the rectangular display area of the display unit 30 were integrated. This can further improve the driver's discomfort caused by a tilted image.

In general, the capturing unit 10 is mounted on a vehicle (vehicle body) so that the rotation incorrectness about the optical axis falls within the range of "−α to +α degrees" with reference to the horizontal line direction (0 degrees). However, when sensuously advantageous, the capturing unit 10 may be mounted in advance on a vehicle (vehicle body) with an angle of +α so that the rotation incorrectness about the optical axis falls within the range of "0 to +2α degrees". In such a case, the image displayed on the display unit 30 may look more natural by performing the non-rectangular image generation processing according to the present disclosure to reduce the discomfort caused by a tilt in one direction.

In the example in the embodiment described above, the vehicle system 1 is used as an electronic outer mirror system that displays the vehicle's laterally rearward images. However, the display control device 20 of the present disclosure can be used in various scenes where it is desired to reduce the discomfort given to the occupants of the vehicle due to a tilted image displayed on the display unit 30 (for example, an electronic inner mirror system that displays the vehicle's rearward image).

In this specification, the non-rectangular image may have various shapes other than a rectangle. For example, the non-rectangular image may have the shape of a quadrilateral such as a trapezoid or may have the shape of an ellipse or a circle.

The display control device for a vehicle according to the present disclosure can be used in a system in which an image captured by a capturing unit is displayed on a display unit. In particular, the display control device is useful in a case where it is desired to reduce the discomfort given to the driver due to a tilted image displayed on the display unit.

What is claimed is:

1. A display control device for a host vehicle, wherein the display control device is mounted on the host vehicle, the display control device is configured to:
generate a non-rectangular image from a rectangular image of an area located rearward of the host vehicle such that a width of the non-rectangular image in a vehicle vertical direction is reduced from near to far with respect to a vehicle body of the host vehicle and toward a horizontal axis of a display unit of the host vehicle, the rectangular image being captured by a capturing unit mounted on the host vehicle, the rectangular image having a horizontal axis that is tilted, and the non-rectangular image having a horizontal axis that has a same tilt as the horizontal axis of the rectangular image; and
display the non-rectangular image in a rectangular display area of the display unit, wherein
an upper edge of the non-rectangular image includes an upper curved portion where no point on the upper curved portion has a tangent that is parallel to the upper edge,
a lower edge of the non-rectangular image, which opposes the upper edge, includes a lower curved portion where no point on the lower curved portion has a tangent that is parallel to the lower edge,
the upper curved portion and the lower curved portion both curve towards an imaginary line passing through the non-rectangular image between the upper edge and the lower edge,
the non-rectangular image is generated such that a width of the non-rectangular image in the vehicle vertical direction is larger in a first part of the non-rectangular image compared with a second part of the non-rectangular image,
the upper curved portion of the non-rectangular image and the lower curved portion of the non-rectangular image are curved in opposite directions such that an amount of decrease in the vehicle vertical direction image width of the non-rectangular image increases from the first part to the second part, and
the non-rectangular image at the second part is compressed at a ratio of (i) a sum of (a) a first length in the vehicle vertical direction between a highest point of the upper edge and a first point on the second part and (b) a second length in the vehicle vertical direction between a lowest point of the lower edge and a second point on the second part to (ii) a third length between the first point and the second point.

2. The display control device according to claim 1, wherein the first part corresponds to a first area located rearward of the host vehicle, and the second part corresponds to a second area located rearward of the host vehicle, the first area being closer to the host vehicle than the second area.

3. The display control device according to claim 1, wherein the display control device is configured to generate the non-rectangular image by extracting a part of the rectangular image from the rectangular image.

4. The display control device according to claim 1, wherein the display control device is configured to display a part included in the rectangular display area of the display unit in a color approximate to a color of an outer frame that surrounds the rectangular display area, the part being an area in which the non-rectangular image is not displayed.

5. The display control device according to claim 1, wherein the display control device is configured to display a part included in the rectangular display area of the display unit in a same color as a color of an outer frame that surrounds the rectangular display area, the part being an area in which the non-rectangular image is not displayed.

6. The display control device according to claim 2, wherein the display control device is configured to generate the non-rectangular image by compressing the rectangular image such that the ratio of the rectangular image gradually increases from the first part to the second part, in the vehicle vertical direction.

7. The display control device according to claim 2, wherein the non-rectangular image is generated such that the width of the non-rectangular image in the vehicle vertical direction is reduced gradually from the first part to the second part.

8. The display control device according to claim 1, wherein the display unit is an electronic mirror and the capturing unit is a sensor positioned on a side of the host vehicle.

9. A display control system for a vehicle, comprising:
a display unit having a rectangular display area; and
a display control device for the vehicle, the display control device being configured to:
generate a non-rectangular image from a rectangular image of an area located rearward of the vehicle such that a width of the non-rectangular image in a vehicle vertical direction is reduced from near to far with respect to a vehicle body of the vehicle and toward a horizontal axis of the display unit, the rectangular image being captured by a capturing unit mounted on the vehicle, the rectangular image having a horizontal axis that is tilted, and the non-rectangular image having a horizontal axis that has a same tilt as the horizontal axis of the rectangular image, and
display the non-rectangular image in the rectangular display area, wherein
an upper edge of the non-rectangular image includes an upper curved portion where no point on the upper curved portion has a tangent that is parallel to the upper edge,
a lower edge of the non-rectangular image, which opposes the upper edge, includes a lower curved portion where no point on the lower curved portion has a tangent that is parallel to the lower edge,
the upper curved portion and the lower curved portion both curve towards an imaginary line passing through the non-rectangular image between the upper edge and the lower edge,
the non-rectangular image is generated such that a width of the non-rectangular image in the vehicle vertical direction is larger in a first part of the non-rectangular image compared with a second part of the non-rectangular image,
the upper curved portion of the non-rectangular image and the lower curved portion of the non-rectangular image are curved in opposite directions such that an amount of decrease in the vehicle vertical direction image width of the non-rectangular image increases from the first part to the second part, and
the non-rectangular image at the second part is compressed at a ratio of (i) a sum of (a) a first length in the vehicle vertical direction between a highest point of the upper edge and a first point on the second part and (b) a second length in the vehicle vertical direction between a lowest point of the lower edge and a second point on the second part to (ii) a third length between the first point and the second point.

10. A display control method for a vehicle, comprising:
generating a non-rectangular image from a rectangular image of an area located rearward of the vehicle such that a width of the non-rectangular image in a vehicle vertical direction is reduced from near to far with respect to a vehicle body of the vehicle and toward a horizontal axis of a display unit of the vehicle, the rectangular image being captured by a capturing unit mounted on the vehicle, the rectangular image having a horizontal axis that is tilted, and the non-rectangular image having a horizontal axis that has a same tilt as the horizontal axis of the rectangular image; and
displaying the non-rectangular image in a rectangular display area of the display unit mounted on the vehicle, wherein
an upper edge of the non-rectangular image includes an upper curved portion where no point on the upper curved portion has a tangent that is parallel to the upper edge,
a lower edge of the non-rectangular image, which opposes the upper edge, includes a lower curved portion where no point on the lower curved portion has a tangent that is parallel to the lower edge,
the upper curved portion and the lower curved portion both curve towards an imaginary line passing through the non-rectangular image between the upper edge and the lower edge,
the non-rectangular image is generated such that a width of the non-rectangular image in the vehicle vertical direction is larger in a first part of the non-rectangular image compared with a second part of the non-rectangular image,
the upper curved portion of the non-rectangular image and the lower curved portion of the non-rectangular image are curved in opposite directions such that an amount of decrease in the vehicle vertical direction image width of the non-rectangular image increases from the first part to the second part, and
the non-rectangular image at the second part is compressed at a ratio of (i) a sum of (a) a first length in the vehicle vertical direction between a highest point of the upper edge and a first point on the second part and (b) a second length in the vehicle vertical direction between a lowest point of the lower edge and a second point on the second part to (ii) a third length between the first point and the second point.

11. The display control device according to claim 1, wherein the tilt of the horizontal axis of the rectangular image corresponds to a rotation of the capturing unit around its optical axis.

12. The display control device according to claim 1, wherein the horizontal axis of the non-rectangular image is titled such that the horizontal axis of the non-rectangular image is not parallel to an outer edge of the rectangular display area.

13. The display control device according to claim 12, wherein the tilt of the horizontal axis of the non-rectangular image corresponds to a rotation of the capturing unit around its optical axis.

14. The display control device according to claim 11, wherein
the horizontal axis of the non-rectangular image is titled such that the horizontal axis of the non-rectangular image is not parallel to an outer edge of the rectangular display area, and
the tilt of the horizontal axis of the non-rectangular image corresponds to the rotation of the capturing unit around its optical axis.

15. The display control device according to claim 1, wherein the horizontal axis of the rectangular image includes a road surface or horizon line of the rectangular image.

16. The display control system according to claim 9, further comprising an outer frame that surrounds the rectangular display area,
wherein the display control device is configured to display a part included in the rectangular display area of the display unit in a color approximate to a color of the outer frame, the part being an area in which the non-rectangular image is not displayed.

17. The display control system according to claim 9, further comprising an outer frame that surrounds the rectangular display area, wherein the display control device is configured to display a part included in the rectangular display area of the display unit in a same color as a color of the outer frame, the part being an area in which the non-rectangular image is not displayed.

18. The display control system according to claim 9, wherein the display unit is mounted on a door of the vehicle.

19. The display control device according to claim 1, wherein a shape of the upper curved portion mirrors a shape of the lower curved portion with respect to the imaginary line.

* * * * *